Jan. 30, 1951 T. J. WATSON ET AL 2,540,038
REGISTER CONTROLLED TIME RECORDER
Original Filed Nov. 17, 1944 8 Sheets-Sheet 1
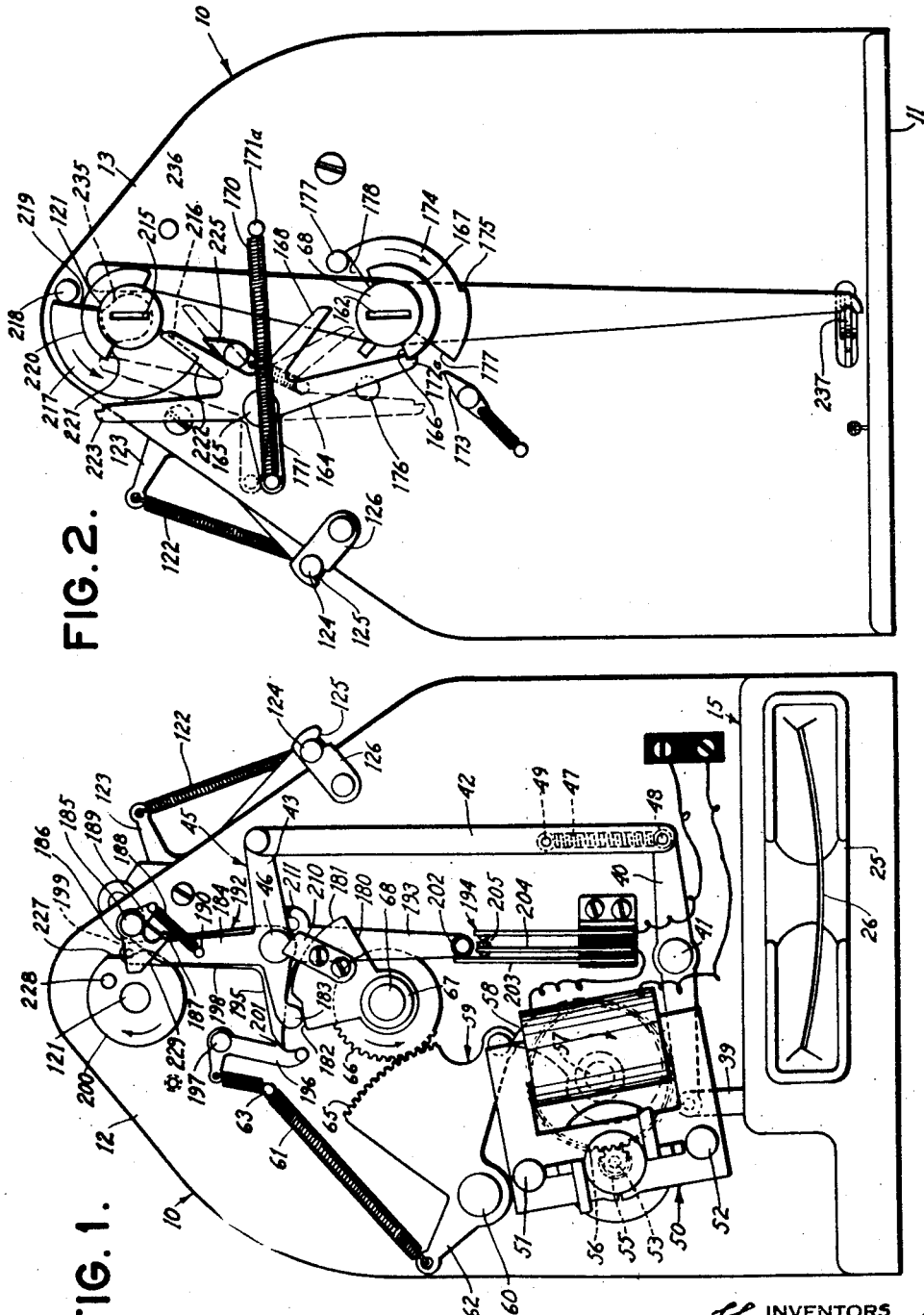

Jan. 30, 1951     T. J. WATSON ET AL     2,540,038
REGISTER CONTROLLED TIME RECORDER

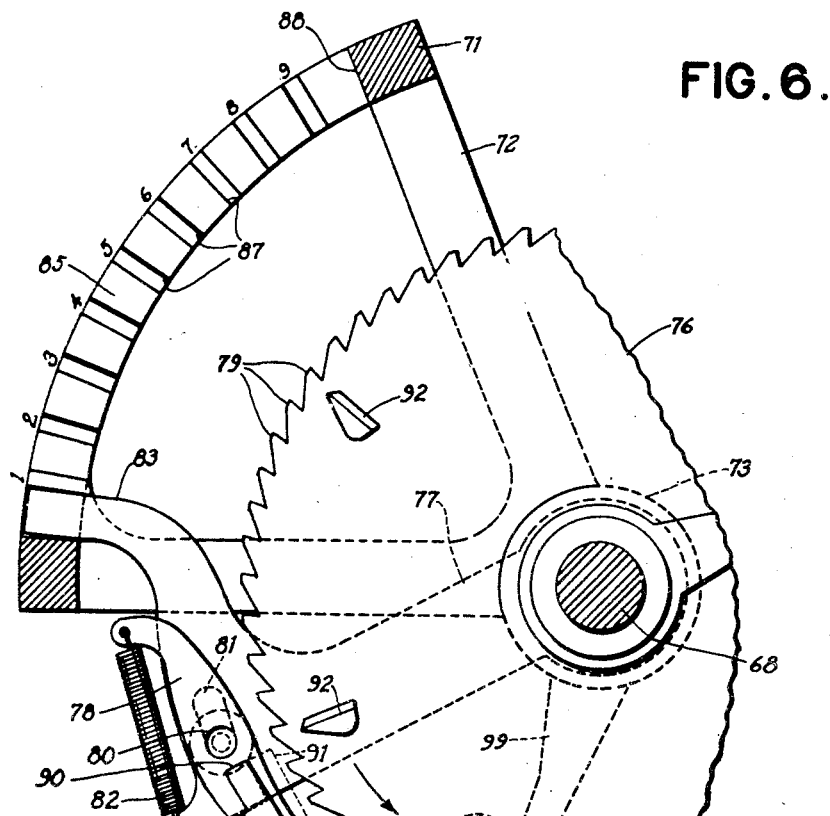
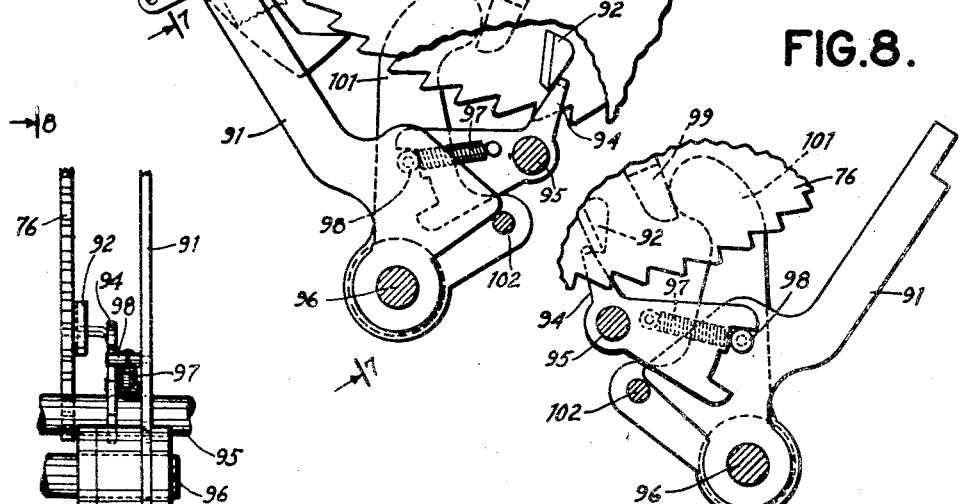
FIG. 6.
FIG. 7.
FIG. 8.

Jan. 30, 1951   T. J. WATSON ET AL   2,540,038
REGISTER CONTROLLED TIME RECORDER
Original Filed Nov. 17, 1944   8 Sheets-Sheet 6

INVENTORS
Thomas J. Watson
Alfred L. Sprucker
BY Edward R. Lowndes
AGENT

Jan. 30, 1951 T. J. WATSON ET AL 2,540,038
REGISTER CONTROLLED TIME RECORDER
Original Filed Nov. 17, 1944 8 Sheets-Sheet 7

Jan. 30, 1951     T. J. WATSON ET AL     2,540,038
REGISTER CONTROLLED TIME RECORDER

Original Filed Nov. 17, 1944     8 Sheets-Sheet 8

Patented Jan. 30, 1951

2,540,038

UNITED STATES PATENT OFFICE 2,540,038

REGISTER CONTROLLED TIME RECORDER

Thomas J. Watson, New Canaan, Conn., and Alfred L. Sprecker, Freeport, N. Y., assignors to International Business Machines Corporation, New York, N. Y., a corporation of New York Original application November 17, 1944, Serial No. 563,918. Divided and this application July 1, 1948, Serial No. 36,334

7 Claims. (Cl. 346—133)

This application is a division of our copending application, Serial No. 563,918, filed November 17, 1944, for a Register-Controlled Time Recorder and which has matured into Patent No. 2,451,790, dated October 19, 1948, and as such relates to recording apparatus in the form of a time recorder of the type assigned to individual workmen and used to record the time spent on a particular job and the cost of the labor and overhead to be assigned thereto. Time recorders of this type are commonly referred to as job cost recorders or bench recorders.

Whereas in our parent application above referred to the principal object thereof was to provide an improved form of time recorder which functions to accumulate desired numerical data at a given time rate and which operates to record the totals of such data by applying data-representing marks of electrically conducting material on a suitable record sheet, such as a standard record card commonly employed in connection with electric accounting machines, the principal object of this invention is to provide a means for effectively marking the cards at the selected index point positions thereof with the conducting material in such a manner that it will be insured that all the interstices of the card where the mark is to be positioned will be adequately filled with the conducting material, thus providing a mark which is positive in its electrical conducting function when used for sensing purposes in an electrical accounting machine.

Heretofore, in the absence of a mechanical means for applying conducting marks to the surface of record cards designed for accounting machine purposes, it has been customary to place these marks at selected index point positions manually by means of a marking pencil, the crayon portion of which contains a conducting material. It has been found that not only does it require considerable skill for an operator to prepare the record cards rapidly and efficiently with a fair degree of uniformity of the marks on the index point positions, but additionally it requires extreme care for the operator to produce marks on the card which are of a sufficient conducting nature as to insure proper processing thereof by the electric accounting machines. If the operator draws the mark across the index point position in one direction only, microscopic examination has shown that insufficient impregnation of the fibrous material of the card is attained. In other words, the microscopic protruding fibers of the card become coated on one side only as they are caused to lie flat against the surface of the card as the pencil is moved thereover in one direction. If, however, the pencil stroke is reversed one or more times across the index point position of the card, both sides of the fibers become coated and a truly conductive mark is attained which offers no difficulty to the subsequent processing of the card in the electric accounting machine. Similarly, where the mark is made in one direction only, any sub-surface voids present in the card do not become completely filled with the conducting material and any elevations on the surface of the card tend to become coated on only one side thereof. These conditions are remedied when the mark is made in both directions as described before.

The above described phenomena has given rise to the present invention and, accordingly, it is an object thereof to provide a time recorder of the type shown and described in our above mentioned application in which, when the marking cycle of operation of the machine is reached, the marking medium is accurately brought into alignment with the selected index point position, lowered into firm and uniform contact with the surface of the record card, and the record card is slid transversely of the marking medium first in one direction and then in the other to produce the desired impregnation of the fibrous material thereof with the marking medium, whether the latter be a solid substance or a liquid one. By such an arrangement, as briefly outlined above, it is possible to obtain a conducting mark at the selected index point position of the card which is of uniform size and shape and which at the same time possesses adequate conducting properties so that there will be no electrical failure on the part of the accounting machine in which the card is ultimately processed.

The provision of a marking apparatus of the type briefly outlined above being the principal object of the invention, another object thereof is to provide a marking device designed for use in connection with this and other types of recording apparatus having novel means associated therewith automatically feeding the marking medium or filler incidental to usage thereof and for compensatively absorbing any operating shocks that may be encountered.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a vertical elevation showing the left-hand end, as viewed from the front, of a time recorder constructed in accordance with the present invention, the enclosing casing or cover having been omitted.

Fig. 2 is a vertical elevation showing the right-hand end of the recorder shown in Fig. 1.

Figure 3:
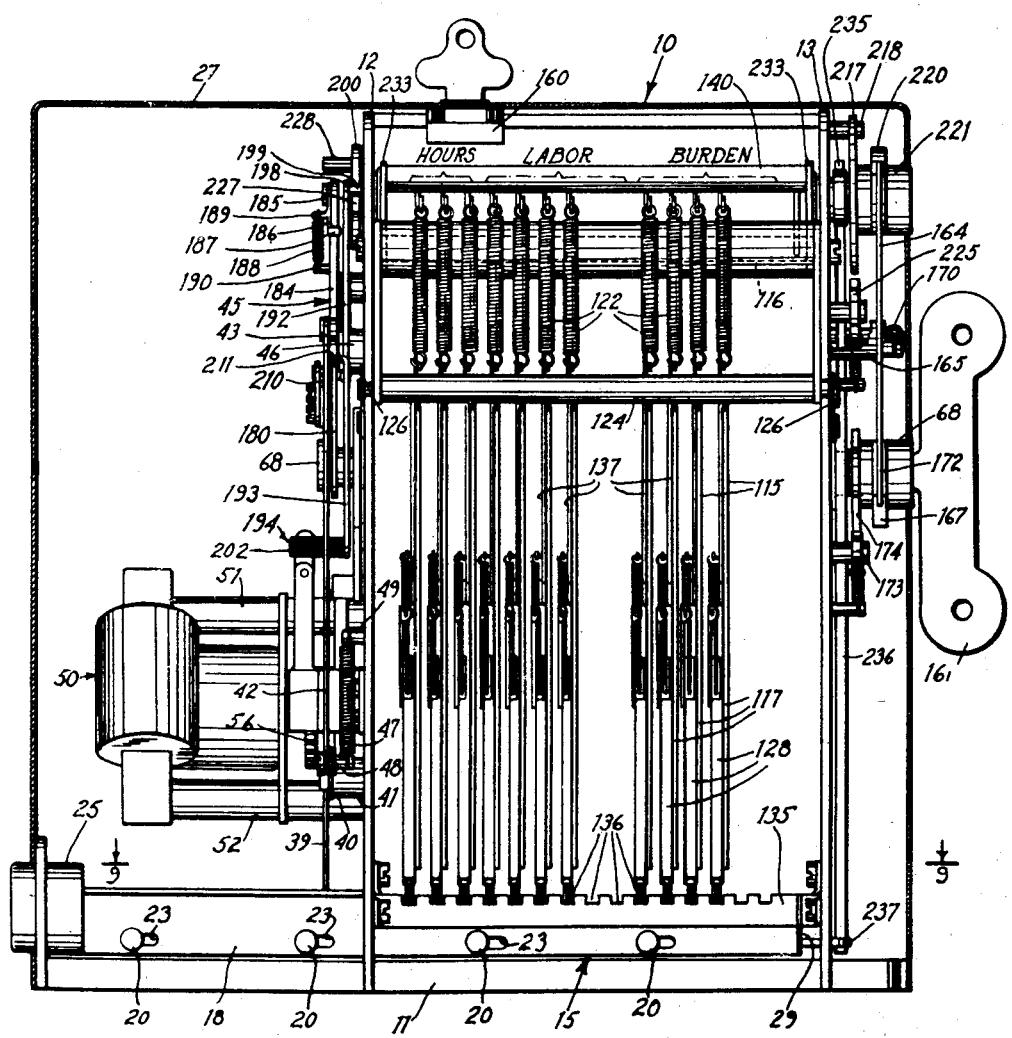
Fig. 3 is a vertical elevation of the recorder as viewed from the front and showing an enclosing casing in section, certain mechanism within the interior of the machine and behind the plane of the drawing having been omitted to avoid possible confusion.
Figure 4:
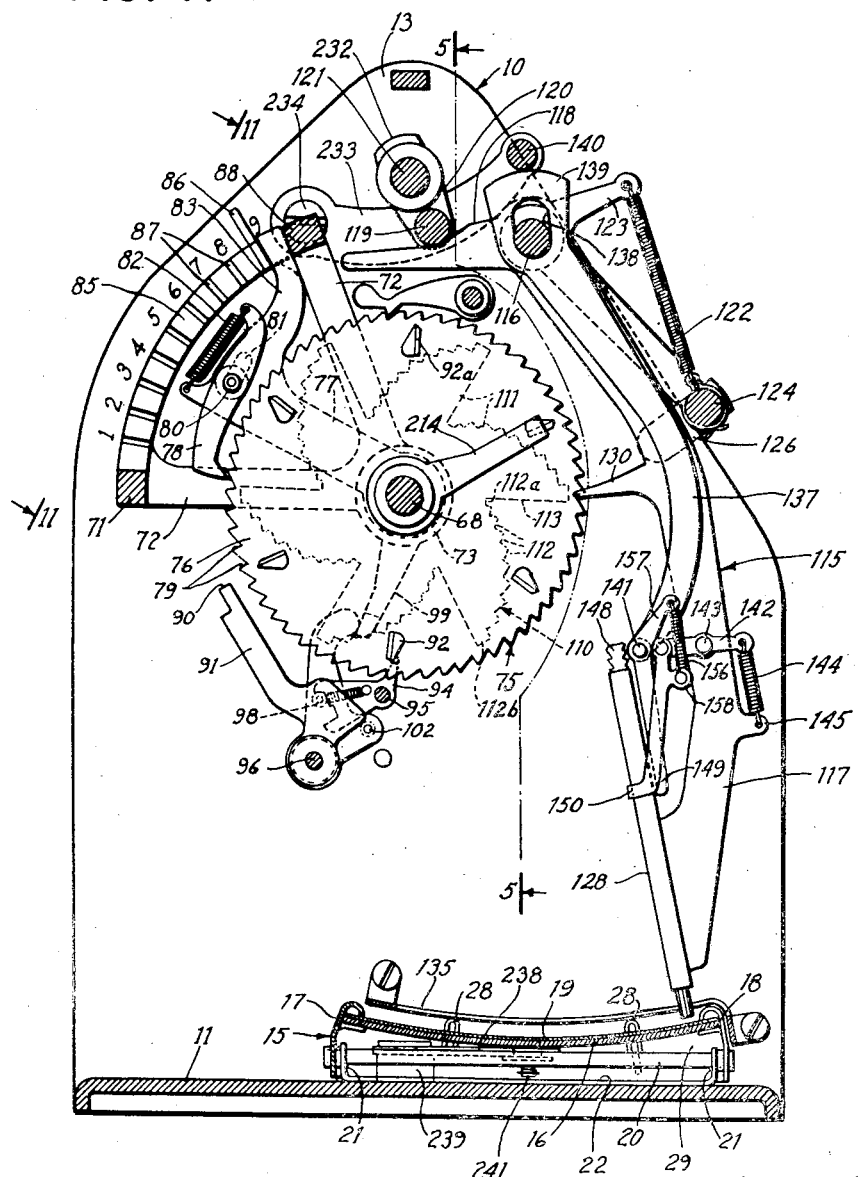
Fig. 4 is a vertical section through the time recorder, the section being taken on the line 4—4 of Fig. 5 looking in the direction of the arrows.
Figure 5:
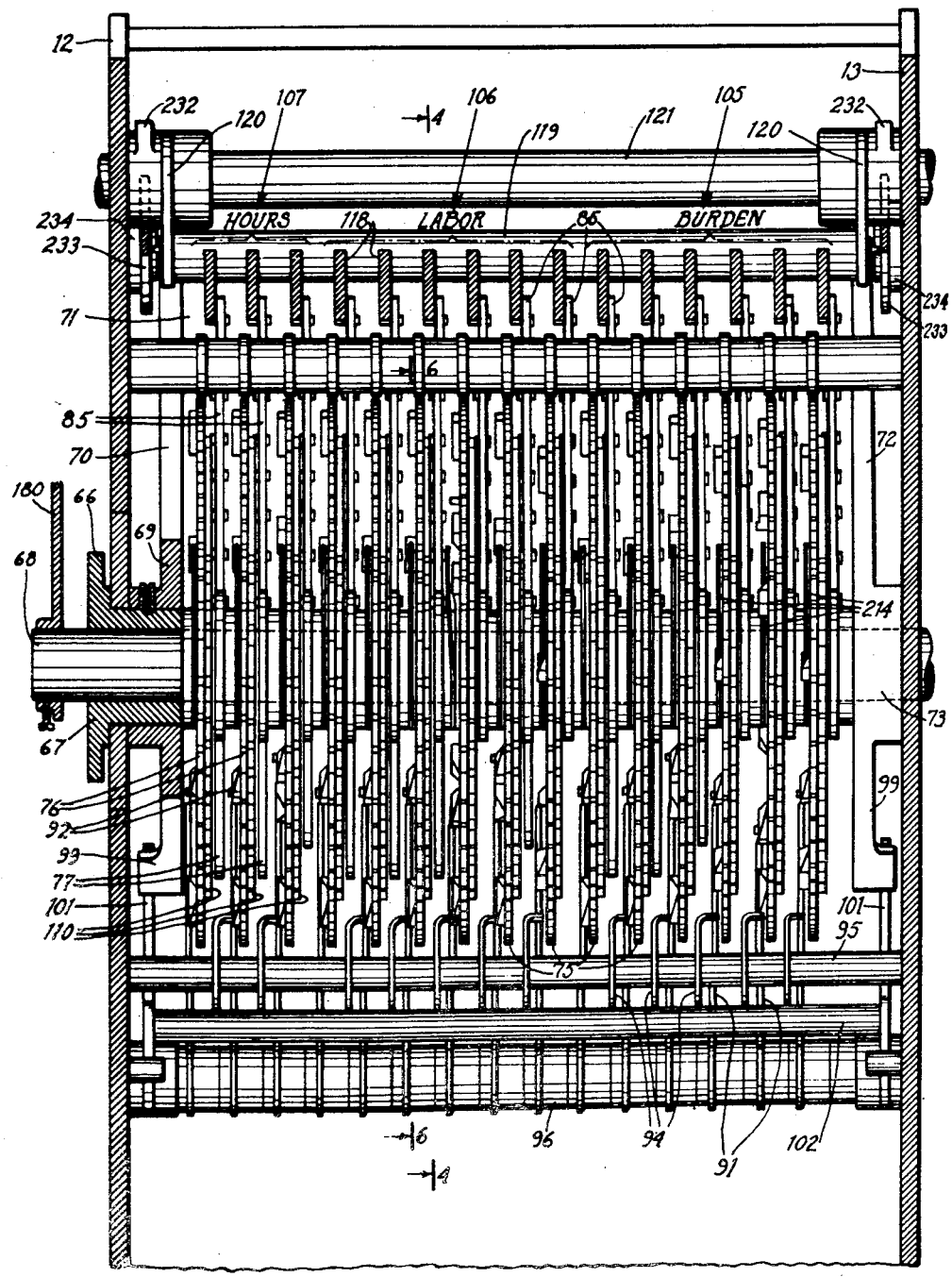

Fig. 5 is an enlarged fragmentary vertical section taken generally on the line 5—5 of Fig. 4 and showing the interior mechanism omitted from Fig. 3, the plane of the section at the left-hand side and near the center thereof being spaced rearwardly from the general plane of the section so as to show the driving connection for certain of the parts. It is noted that most of the parts appearing in Figs. 1, 2, and 3 outside of the two upright support plates have been omitted from Fig. 5.

Fig. 6 is an enlarged fragmentary vertical section taken on the line 6—6 of Fig. 5 and illustrating how a carry is effected between adjacent denominational orders of an accumulator.

Fig. 7 is an enlarged fragmentary detail showing certain elements of the carry means as viewed from the plane represented by the 7—7 line of Fig. 6.

Fig. 8 is an enlarged fragmentary detail also showing certain elements of the carry means and as viewed from the plane represented by the line 8—8 of Fig. 7.

Figures 9, 10:
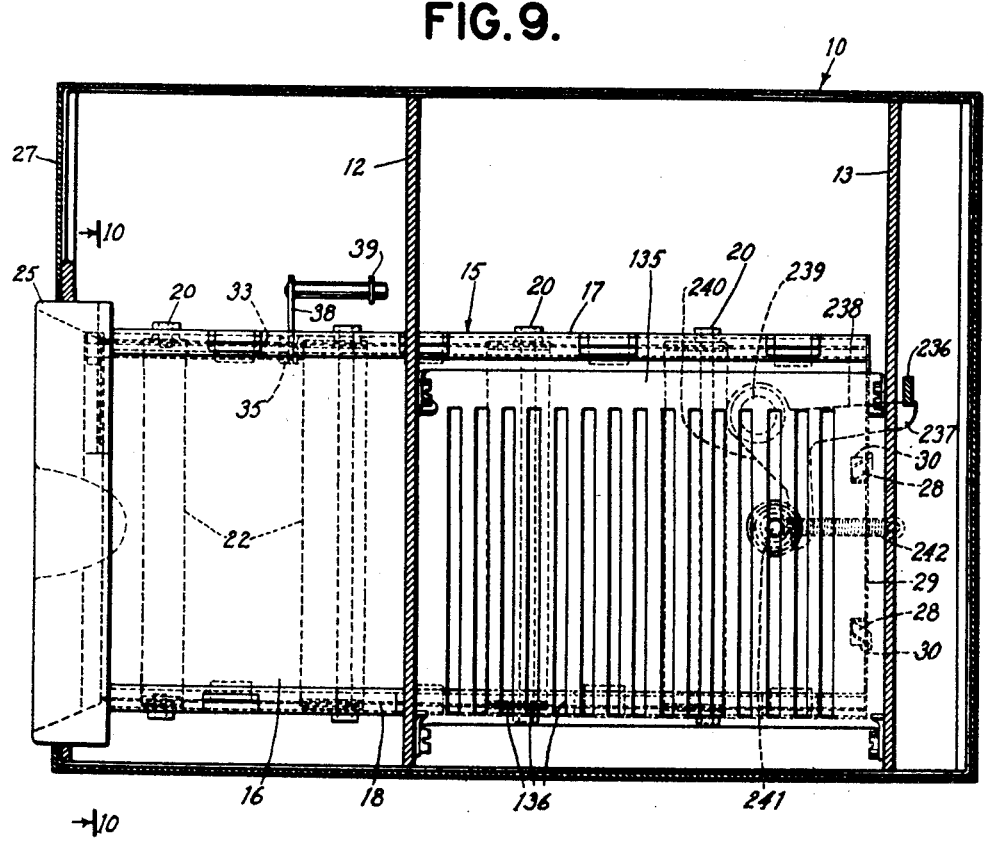

Fig. 9 is a plan section showing the base of the recorder and the elements of the card holder, the view being taken on the line 9—9 of Fig. 3.

Fig. 10 is a transverse vertical section through the card receiving throat, the section being taken on the line 10—10 of Fig. 9.

Figure 11:
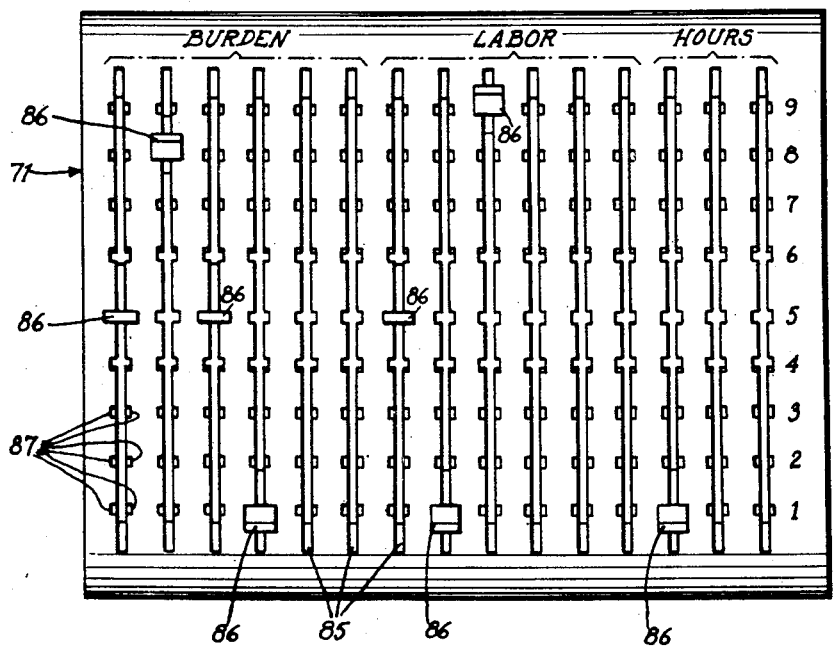

Fig. 11 is an enlarged face view of the feed pawl operating plate as viewed from the plane represented by the lines 11—11 of Fig. 4, and showing an example of how the presettable stops may be arranged to effect the entering of certain desired data into the accumulator order elements.

Figure 12:
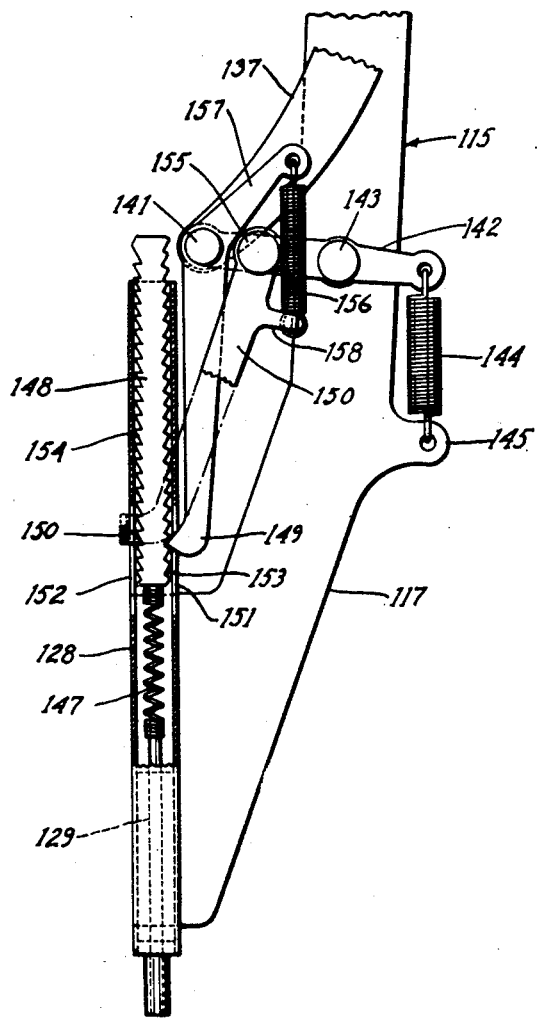

Fig. 12 is an enlarged detail sectional view taken on the longitudinal center line of a data recording pencil.

Fig. 13 is a view showing one example of a record card on which the recorder shown in Figs. 1 to 12 inclusive, records accumulated data.

Referring now in detail to the drawings and particularly to Figs. 1 to 5 inclusive and 9, a preferred embodiment of time recorder is indicated generally by the reference numeral 10 and comprises a supporting frame structure including a horizontal base plate 11 and a pair of upstanding spaced supporting plates 12 and 13, respectively, extending across the base 11 from front to rear thereof and suitably fixed at their lower ends to the base.

Mounted on the base plate 11 and extending from the left-hand side, as viewed in Figs. 3 and 9, to the right-hand side thereof, is a card holder 15. The card holder comprises a curved bottom plate 16 (see also Fig. 4) and a pair of upstanding side plates 17 and 18, respectively, having their upper longitudinal edges turned over toward one another and then downward and terminating short of the bottom plate to provide spaces therebetween of the proper dimensions for receiving the upper and lower longitudinal edges of a record card 19. The card 19 is preferably a standard type of card used to control operation of a well known commercial form of electric accounting machine. In Fig. 4, the card 19 is shown in its proper position in the card holder 15. The card is shown in enlarged detail in Fig. 13. In order to avoid confusion, the card has been omitted from Fig. 9. It is to be noted, however, that if the card had been shown in Fig. 9, it would have appeared therein in the same position as it appears in Fig. 13.

The card holder 15 is supported for limited longitudinal movement with respect to the base plate 11 for a purpose which will presently appear. The card holder supporting means comprises a plurality of spaced rollers 20 mounted, respectively, within aligned openings extending through upstanding lugs 21 formed on the ends of bracket plates 22, the ends of each roller 20 extending through aligned slots 23 in the upstanding side plates 17 and 18. The bracket plates 22 are suitably fixed to the base plate 11. The normal position of the card holder is that which is shown in the drawings. The card holder is moved only during a recording operation, as will later appear.

On the left-hand end of the card holder 15 as viewed in Fig. 9, is fixed a card throat 25 of suitable molded material and being formed with a curved slot 26 through which the card 19 may be inserted and removed endwise from the holder 15. The throat 25 occupies a suitable recess in an end wall of an enclosing casing or cover 27 of the recorder and is movable with the rest of the card holder. The card holder is provided at its right-hand end with upstanding spring fingers 28 which are fixed to an end plate 29 of the card holder and extend upwardly through suitable openings 30 provided in the curved bottom plate 16. When a card 19 is fully inserted within the holder 15, the right-hand end of the card engages the fingers 28 and holds the latter in a deflected condition so that at the end of a recording operation when the card is released the fingers 28 will partially eject the card 19 from the card holder.

The card is held within the card holder at all times when the recorder is operating by a card latch (see Figs. 9 and 10). The latch comprises an arm 32 fixed at one end to a shaft 33 journaled in spaced brackets 35 extending inwardly from the side plate 17. The arm 32 moves within a recess 36 formed in the throat 25 and moves from a non-operating position where its outer end 37 is below the card slot 26 to an operating position shown in Fig. 10 where the end 37 is across the slot 26 and engaging the left-hand end of the card 19 to hold the latter in its fully inserted position. The card latch is operated by a second arm 38 fixed at one end to the shaft 33 and connected at its outer end to the lower end of a link 39, the upper end of the latter being pivoted to the outer end of one arm of a rocker lever 40 (see also Figs. 1 and 3) which is in turn pivoted on a fixed stud 41 projecting from the vertical support plate 12. The other arm of the lever 40 is connected at its outer end to the lower end of an operating link 42 and the latter is pivoted at its upper end to one arm 43 of a bell crank lever 45 which is fulcrumed on a fixed stud 46 projecting from the plate 12. The card latch lever arm 32 and the connected levers and linkage just described are constantly urged to move in a direction to latch the card by a spring 47 connected at its lower end to the pivot pin 48 connecting the link 42 and lever 40, and connected at its upper end to a stud 49 projecting from the plate 12.

The time recorder disclosed herein includes an operating mechanism which operates at a predetermined time rate. Insofar as certain of the broader aspects of the present invention are concerned, this operating mechanism may be of any suitable type such, for example, as a spring-driven, marine-escapement clock movement, a time mechanism operated by minute impulses from the controlling electrical circuit of a clock system, or the operating mechanism may comprise a synchronous or frequency controlled AC motor. In the preferred embodiment disclosed herein the time operating mechanism comprises a frequency controlled AC motor 50 of well known form which is suitably supported from the vertical plate 12 by studs 51 and 52 and includes a motor drive shaft 53 to which is fixed a pinion 55 meshing with a gear 56 rotatably mounted on a stud 57 also projecting from the plate 12. Fixed to the gear 56 is a driving cam 58. The motor shaft 53 operates at one (1) R. P. M. and the pinion 55 and gear 56 are of such relative sizes that the driving cam 58 is rotated at one-tenth ($\frac{1}{10}$) R. P. H.

Coacting with the cam 58 is a cam follower 59 (Fig. 1) which is pivotally supported by a stud 60 projecting from the support plate 12 and is held in engagement with the cam by a tension spring 61 connecting a tail element 62 of the follower with a fixed stud 63 on the plate 12. The cam follower is formed to include a gear sector 65 which meshes with a mutilated gear 66 formed on one end of a sleeve 67, the latter being rotatably supported within an opening provided through the support plate 12 and encircling a start shaft 68 which extends through both support plates 12 and 13 (see Fig. 5). Fixed to the sleeve 67 at the side of the plate 12 opposite to the gear 66, is a hub 69 having a pair of radial arms 70 which are connected at their outer ends to one end of a semi-cylindrical driving plate 71, the other end of such plate being connected to the outer ends of a second pair of radial arms 72 which terminate inwardly in a second hub 73 journaled on the start shaft 68 adjacent the support plate. From the foregoing, it is apparent that with the cam 58 rotating at the rate of $\frac{1}{10}$ R. P. H., the follower 59 is oscillated once each $\frac{1}{10}$ of an hour and the driving plate 71 is also oscillated once each $\frac{1}{10}$ of an hour through its connection with the followers 59, which, as just stated, includes the gears 65 and 66, the sleeve 67 and the arms 71.

The preferred embodiment of time recorder disclosed herein also includes a register comprising a totalizing or accumulating mechanism which may be operated to accumulate desired numerical data at a predetermined time rate. The accumulating mechanism comprises generally a plurality of accumulator order elements 75 rotatably supported by the start shaft 68, a data entering means for each of the order elements 75, and an entry control means, which includes the driving plate 71 and which may be adjusted to enter any desired digital value representation into any order element during each oscillation of the plate 71 which, as stated above, occurs each $\frac{1}{10}$ of an hour while the recorder is in operation.

Each accumulator order element is shown as comprising a ratchet wheel 76 having sixty teeth thereon. Each time a ratchet wheel 76 is advanced counterclockwise, as viewed in Fig. 4, by the entering means, a distance equal to one tooth space, such advance represents an entry in that order of one unit of digital value. The data entering means for each order element, or ratchet wheel, comprises an arm 77 arranged alongside its related ratchet wheel and rotatably supported at one end on the start shaft 68. Each arm 77 carries an advancing pawl 78 which operatively engages the teeth 79 of its related ratchet wheel 76 to move the latter counterclockwise. Each pawl 78 is pivotally connected to its related arm 77 by a pin 80 extending through an opening in the pawl and through an arcuate slot 81 formed in the arm. The length of the slot 81 is equivalent to one tooth space on a ratchet wheel 76. Each pivot pin 80 is normally held in the lower end of its slot by a tension spring 82 connecting the related pawl and arm. Each pawl-carrying arm 77 is formed with an integral outwardly extending projection 83 which moves within a related slot 85 (Figs. 4, 5 and 11) formed in the semi-cylindrical driving plate 71.

The driving plate 71 forms one element of the entry control means and the latter also includes presettable stops 86, which are selectively positionable, respectively, within pairs of transversely aligned radial grooves 87 formed in the sides of the slots 85. As shown in Figs. 5 and 11 there is one slot 85 for each pawl-carrying arm 77 and its related order ratchet wheel 76. There are nine pairs of arcuately spaced grooves 87 in each slot 85 and they represent, respectively, the nine digits "1" to "9" inclusive. When a settable stop 86 occupies a selected pair of grooves 87 in one slot 85 and the drive plate 71 is oscillated by the means previously described, once each $\frac{1}{10}$ of an hour, the digital value corresponding to the position of such settable stop is entered in the related order ratchet wheel.

The plate 71 moves through an arc of 63° during each oscillation. Each 6° of such angular movement of the plate 71 corresponds to an angular movement of one tooth space of the ratchet wheels. The remaining 3° of angular movement of the plate 71 is provided so that the pawls 78 at the upper end of their clockwise movement will override slightly the ratchet teeth and thereby assure engagement with the correct ratchet teeth. It will be noted from an examination of Figs. 1, 4 and 6 of the drawings that the follower 59 is shown at the peak of the cam 58 and the plate 71 correspondingly is at the upper end of its clockwise movement. Each of the pawls is shown as being ½ tooth space beyond a ratchet tooth. When the follower 59 drops off the high point of the cam 58, the plate 71 quickly moves counterclockwise for the 63° under force of the spring 61 to effect entering of the digital values represented by the selected position of the stops 86 in the slots 85.

The digital value entry in each order is effected during such counterclockwise movement of the plate by the upper end 88 of its related slot 85 engaging the projection 83 of its related arm 77 and moving such arm 77, its pawl 78 and its ratchet wheel 76 counterclockwise an amount determined by the angular position occupied by the projection 83 of such arm at the time it is engaged by the end 88 of the slot 85. This angular position of each such projection 83 at the beginning of its counterclockwise movement is determined by the position of the stop 86 in its related slot 85. At the lower end of the movement of the plate 71, the ends 88 of all slots engage their related projections 83 of the pawl-carrying arms 77. When the plate 71 moves upward and clockwise the projections 83 and their pawl-carrying arms 77 will not move clockwise therewith until such projections are engaged by stops 86 in their related slots 85. Therefore, the amount of clockwise movement of each projection and its pawl-carrying arm and the angular position of each such projection at the end of such clockwise movement depends entirely upon the position of the stop 86 in its related slot 85. The digital values corresponding to the different pairs of grooves in each slot 85 are indicated in Figs. 4 and 6 by corresponding numerals above the grooves and in Fig. 11 by corresponding numerals along the right-hand side of the plate and opposite the grooves.

In Fig. 4 a stop 86 is shown in the "9" digit position and the plate 71 is shown at the end of its upward or clockwise movement. Thus, when the plate 71 moves counterclockwise, the pawl 78 will move the related ratchet wheel an amount equivalent to nine tooth spaces which represents a digit entry of nine in such ratchet wheel. The 63 angular degrees of counterclockwise movement of the plate 71 is the equivalent of 10½ teeth of travel of the ratchet wheels. The first 3° of counterclockwise movement of the plate and pawl will bring the pawl into operative engagement with the ratchet tooth. In order to provide a digit value entry of only nine in a ratchet wheel when the plate 71 moves the arm 77 for the remaining 60° of its counterclockwise movement, such as will be the case when a stop 86 occupies the position shown in Fig. 4, the related pawl 78 is stopped by the upper end 90 of a stop arm 91 engaging an outward projection of the pivot pin 80 when the pawl 78 has moved 54° of the remaining 60° of movement of the plate 71. The 54° corresponds to nine tooth spaces of movement of the ratchet wheel 76. When the pin 80 strikes the end 90 of the arm 91, further counterclockwise movement of the pawl 78 and ratchet wheel 76 is prevented. However, the plate 71 and arm 77 are permitted to continue their clockwise movement for the remaining 6° by reason of the slot 81 in the arm 71. As will be apparent, a similar operation also takes place upon the entry of any of the digit values "1" to "8" inclusive; i. e., during each entering operation, the plate 71 moves the projection 83 and its pawl-carrying arm 77 an angular distance equal to 6°, or one tooth space, more than the pawl 78 is moved, when the stop arm 91 occupies its normal position shown in the drawings.

The just-described extra one tooth space of movement of the plate 71 and arm 77 is utilized when it is desired to enter a carry unit of digital value in a higher order element, which occurs when the next lower order element is moved from "9" to "0." When the latter is to take place, the arm 91 normally in the path of the pivot pin 80 for such higher order element, is moved clockwise out of the way of such pin 80 by the next lower order element; and, as a result, the pawl 78 and ratchet wheel 76 of such higher order element are moved by the arm 77 the angular distance corresponding to the digit value to be entered in the normal way in such higher element, plus the extra one tooth space to effect the entry of the carry unit of value. For example, if the stop for such next higher order element is set at the "5" digit position, the related pawl-carrying arm 77 would move its ratchet wheel 76 the equivalent of five tooth spaces to enter five units in such order in the normal way and then move the ratchet wheel an extra tooth space to enter the carry unit of digital value. If such next higher order element is being used only as a storage order element, like the ratchet wheel 76 in Fig. 6, then there would be no stop 86 set in its related slot 85 of the plate 71 and when its arm 91 is moved out of the path of its pin 80 by the next lower order element to effect the entering of a carry, the ratchet wheel 76 of the higher order will only be advanced the one tooth space.

The carry means will be understood more clearly from an examination of Figs. 4, 5, 6, 7 and 8. Each ratchet wheel is provided with six lugs 92 circumferentially spaced so that each time a ratchet wheel representing a lower order is advanced from a position representing the digit "9" to the position representing the digit "0," one of the lugs 92 engages and moves a related trip lever 94 clockwise, as viewed in Fig. 6, about a support shaft 95 extending between the two main support plates 12 and 13. The left-hand end of each trip lever 94 as viewed in Figs. 4 and 6, is formed to provide a two-step positioning stop for the arm 91 of the ratchet wheel of the next higher order. The arms 91 are pivotally supported on a shaft 96 which is in turn supported at its ends by the support plates 12 and 13. The arms 91 are held in either of the step positions of its coacting trip lever 94 by a tension spring 97. The normal position for the arms 91 and coacting trip levers 94 is that shown in the drawing. When a lug 92 of a lower order trips a lever 94 and moves it clockwise, its spring 97 moves its coacting arm 91 clockwise so that a pin 98 carried by such arm 91 engages the lower step position of the lever 94 and the arm 91 then is in the position where the pin 80 of the next higher order element will not engage the end 90 of such arm (see the dotted line position of the end of the arm 91 indicated in Fig. 6). The several arms 91 and coacting trip levers 94 are restored to their normal position shown during the next upward or clockwise movement of driving plate 71, by means of depending arms 99 on the hubs 69 and 73 operatively engaging, respectively, a pair of arms 101 journaled on the ends of shaft 96 and connected by a bail 102 (see also Fig. 5). When the arms 99 are moved clockwise as viewed in Figs. 4 and 6 along with the driving plate, such arms 99 move the arms 101 and bail 102 counterclockwise into engagement with any of the arms 91 which were tripped to effect the entering of carry units during the entry portion of the preceding cycle of operation. The bail 102 moves the arms 91 counterclockwise to the normal position shown and the springs 97 move their coacting trip levers 94 back to the position shown.

In the construction illustrated, there are fifteen order elements 75 (see Fig. 5) and they are grouped to provide three separate registers or accumulators indicated, respectively, by the reference characters 105, 106 and 107. The accumulator 105 is composed of the six order elements at the right-hand side of Fig. 5 and is used herein to accumulate the burden or overhead cost for each job. The legend "Burden" appears in Fig. 5 above the order elements of accumulator 105. The order element at the left of the group composing the accumulator 105 accumulates tens of dollars, the second from the left accumulates units of dollars, the third tenths of dollars, the fourth hundredths of dollars; the fifth thousandths of dollars, and the sixth ten-thousandths of dollars. The accumulator 106 is composed of the six order element 75 to the left of the accumulator 105, and is used to accumulate the labor cost for the job. The legend "Labor" appears in Fig. 5 above the order elements of this accumulator. Like the accumulator 105, the order element 75 at the left of the group composing the accumulator 106 accumulates tens of dollars, the next one to the right thereof accumulates units of dollars, the next tenths, the next hundredths, the next thousandths, and the sixth from the left accumulates ten-thousandths. The accumulator 107 is composed of the three order elements at the extreme left of Fig. 5 and is used to accumulate the time required for each job. The legend "Hours" appears above this accumulator 107. The order element 75 at the right of the group composing accumulator 107 is used to accumulate tenths of hours, the next order to the left thereof stores units of hours, and the one on the extreme left stores tens of hours. The order elements at the extreme left of the accumulator 105 as viewed in Fig. 5, and the order element at the extreme left of accumulator 106 are not provided with trip levers 94, the reason being to prevent carrying operations between accumulators.

One example of the manner in which the recorder may be used to accumulate digital values, is indicated in Fig. 11 by the positions of the stops 86 in the pairs of grooves 87 in the slots 85. As Fig. 11 shows the outer face of the driving plate 71, which is the one opposite to that shown in Fig. 5, the positions of the slots 85, Fig. 11, corresponding, respectively, to the order elements 75 of the accumulators 105, 106 and 107, are reversed with respect to their positions shown in Fig. 5. The three slots 85 at the right of Fig. 11 are those corresponding to the accumulator 107 which stores units of time. The legend "Hours" appears at the top of these three slots. A stop 86 is shown in the "1" digit position of the left-hand one of the slots 85 and no stops 86 are shown in the other two slots. With this arrangement one digital unit of time is entered into the corresponding tenths order of the accumulator 107 each 1/10 of an hour. As no stops 86 are in the other two slots 85 of the accumulator 107, the order elements 75 corresponding thereto merely store digital units of time which are entered therein by the carry means as explained above. The six slots 85 at the left of those just described are those corresponding to the order elements of the accumulator 106. The legend "Labor" appears over the top of these six slots. The example selected for a labor rate is ninety-one and one-half cents an hour. Hence, the stops 86 are set in the proper slots to effect the entering during each 1/10 of an hour in the order elements of the accumulator 106 digital values representing nine hundred fifteen ten-thousandths of a dollar ($0.0915). The legend "Burden" appears over the top of the six slots 85 at the left of Fig. 11 as these slots correspond, respectively, to the six order elements of the accumulator 105. The selected example of a burden rate is one dollar and fifty-eight and one-half cents ($1.585) per hour. Consequently, stops 86 are so placed in the slots 85 under the word "Burden" in Fig. 11 that each 1/10 of an hour the plate 71 provides for the entering in the related order elements of accumulator 105 of digital values representing fifteen hundred and eighty-five ten-thousandths of a dollar ($0.1585). It will be obvious that the order elements of both accumulators 105 and 106 corresponding to the slots 85 shown in Fig. 11 with no stops 86 set therein, will function purely as storage orders.

From the foregoing, it will be apparent that, with the motor 50 operating, during each one-tenth of an hour one unit of digital value will be entered into accumulator 107, digital values representing $0.0915 will be entered into the accumulator 106, and digital values representing $0.1585 in the accumulator 105. The drawings show the order elements in the positions they occupy after one entering operation has taken place and show the cam 58, the plate 71 and the pawl-carrying arms 77 in the position they occupy just before the beginning of a second entering operation.

The recorder disclosed herein also comprises a mechanism which is operated by the workman when a particular job is finished, to record in one operation on the record card 19 in the card holder 15, the amount of time spent on the job which is standing in the accumulator 107, the money value of the labor at the workman's rate which is accumulated in the accumulator 106, and the money value of the burden or overhead cost at the predetermined rate which is standing in the accumulator 105. To this end, each order element 75 of the three accumulators also comprises a star wheel 110 fixed to the side of its related ratchet wheel 76 and including six identical segments 111, with each segment being formed at one side with ten positioning steps 112 corresponding, repectively, to the ten digits "0" through "9," and being formed on the opposite side as a radially extending straight edge 113. The lowest step 112a of each segment corresponds to the digit "0" and the highest step 112b the digit "9."

As shown in Figs. 3 and 4, the recording mechanism comprises a plurality of levers 115 corresponding, respectively, to orders of the accumulators, and pivoted at their upper ends on a shaft 116 supported by the two plates 12 and 13 so that when a recording is to be effected the levers 115 may be moved in planes normal to the axis of the star wheels 110. Each lever 115 comprises a downwardly extending arm 117 and a laterally extending arm 118 and is held in its normal position shown by a bail rod 119 engaging the arms 118 of all of the levers. The bail rod 119 is connected at its ends to spaced lever arms 120 fixed to a stop shaft 121 which extends through both supporting plates 12 and 13. Each lever 115 is constantly urged to move in a clockwise direction about its supporting shaft 116 by a tension spring 122 connected at its upper end to a tail element 123 of such lever 115 and connected at its lower end to a rod 124 removably held at its ends in slots 125 in brackets 126 carried by the support plates 12 and 13 (see Figs. 1, 2, 3 and 4). The arm 117 of each lever 115 carries at its lower end a pencil barrel 128 (see Figs. 4 and 12) for slidably holding and guiding a lead 129 which is made of a suitable electrically conducting material and functions to place a mark of this material in the proper index point of digit position on the card 19 when a recording is effected. Each arm 117 is also formed with a cam finger 130 which, when a recording is desired, is moved inward to engage a positioning step 112 on the star wheel 110 of its related order 75. The step 112 engaged by each finger 130 each time its arm 117 is moved inward, is the one corresponding to the unit of digital value standing at that time in the order 75 of the accumulator of which the step 112 is a part.

With the exception of the denominational orders representing thousandths and ten-thousandths of dollars in the accumulators 105 and 106, a lever 115, with its arm 117 carrying a pencil barrel 128, is provided for each denominational order of each of the three accumulators shown (see Fig. 3). The reason for omitting levers 115 from the orders just named is that there would be no practical value in recording on the card the fractional values standing in such orders, such orders being useful in entering labor and burden rates requiring the use of fractional values, like the example of rates given hereinabove.

In Fig. 13 of the drawings there is shown an example of record card 19 designed for use with the recorder disclosed herein. The card 19 is a conventional 80 column card used with electrical accounting machines, which has been specially designed for use with the recorder of the present invention. The smaller numerals indicate the index point or digit positions of the columns which may be punched to represent data in a manner well known in the accounting machine art. The larger numerals indicate index points or digit positions used for recording by the present recorder. It is noted that the positions used by the present recorder are staggered with respect to the accounting machine positions. This is so that data may be recorded by punching in the usual way in all of the 80 columns. The card 19 is provided with three fields of the larger numerals for recording by the present recorder, such fields being indicated by the numerals 132, 133, and 134 and corresponding, respectively, to the accumulators 105, 106 and 107. As shown, the field 134 is composed of three columns of ten digit positions for the purpose of recording on the card the time consumed on the job which is standing in the accumulator 107. The field 133 is provided with four columns of ten digit positions for recording the money values of the labor on the job standing in accumulator 106. The field 132 is provided with four columns for recording the money value of the burden or overhead standing in accumulator 105.

When the card 19 is fully inserted within the card holder 15, the lower ends of the barrels 128 which are carried by the several arms 117 are aligned, respectively, with the columns on the card which correspond thereto and which correspond to their related order elements 75 of the accumulators 105, 106 and 107. The proper alignment is maintained by a guide plate 135 suitably fixed to the upright support plates 12 and 13 and formed with guide slots 136 receiving, respectively, the lower ends of the barrels 128 (see Figs. 3 and 9).

Associated with each lever 115 and its arm 117 is a second arm 137 which positions and operates the pencil lead 129 in the barrel 128 of its related arm 117. The upper end of each arm 137 is formed with a slot 138 (see Fig. 4) receiving the shaft 116, and with an upper cam surface 139 adapted to be engaged by a cam operated bail 140 when a recording is to be effected, as will presently appear. As shown in Fig. 12, the lower end of each arm 137 is pivoted by a pin 141 to one end of a rocker lever 142, the latter being pivoted intermediate its ends by a pin 143 on its related arm 117 and the other end of each rocker 142 being connected by a tension spring 144 to a projection 145 of its related arm 117. Each spring 144 functions through its rocker lever 142 to hold its arm 137 in its normal rest position with the shaft 116 engaging the bottom of its slot 138.

As shown in Fig. 12, each pencil lead 129 is vertically movable within the bore of its barrel 128 and is connected by a spring 147 to the lower end of a rack 148 which also moves axially within the barrel. Each rack 148 is held firmly by two pawls 149 and 150 extending through slots 151 and 152 in the barrel 128 and engaging teeth 153 and 154, respectively, formed on opposite sides of the rack 148. The upper ends of the pawls 149 and 150 are pivoted, respectively, by the pin 141 and by a pin 155 to the rocker lever 142. A tension spring 156 connecting tail elements 157 and 158 of the pawls 149 and 150, respectively, constantly urges the pawls into engaging relationship with their respective sets of teeth. The pivot pins 141 and 155, respectively, are spaced such distances from the pivot pin 143 that during each downward movement of the arm 137, the pawl 149 moves a distance equal to five of the rack teeth 153 and the pawl 150 moves a distance equal to three of the rack teeth 154. As will be noted, the teeth 154 and pawl 150 are so shaped that the rack 148 can move downward with respect to the pawl 150 and that the pawl 150 can move upward with respect to the rack, the pawl 150 simply ratcheting over a tooth 154 into the next tooth space. However, the shape of the teeth 154 prevents upward movement of the rack with respect to the pawl 150 for a distance as much as one tooth space. The teeth 153 and pawl 149 are so shaped that they can be moved any number of tooth spaces relatively to one another in either direction. When sufficient force is applied to effect the latter, the pawl 149 will be cammed by the teeth 153 out of one tooth into the next.

When the arms 137 are moved downward by the cam operated bail 140 for the purpose of effecting a recording, in a manner which will be presently described, each pair of cooperating pawls 149 and 150 move their related rack 148 downward in the barrel 128. With a fresh lead 129 in a barrel 128, the lower end of the lead 129 will touch the record card 19 when the rack 148 has been moved downward from the position shown a distance equal to one tooth space. When the rack has moved downward a second tooth space the minimum amount of compression pressure will be placed on the spring 147 to effect marking on the card. Further downward movement for the next or third tooth space will place additional compression pressure on the spring 147 without damaging the lead. The relative strength of the springs 147 and 156 is such that with a fresh lead further downward movement of the rack 148 beyond the three tooth spaces just mentioned, will be prevented by the resistance offered by the spring 147, and the spring 156 will then yield and thereby permit the pawl 149 to be cammed out of one tooth space into the next. This action will permit the pawl 149 to be moved downward relative to the rack 148 a distance equal to the two additional tooth spaces of the full travel of pawl 149. At the end of downward travel, the pawl 150 will fully occupy a tooth space, the length of its travel being three tooth spaces while the pawl 149 travels five. When the arm 137 is moved upward and back to its normal position shown the rack 148 is raised due to the gripping force of the pawls 149 and 150. Because the pawl 149 moves five spaces while the pawl 150 moves three and as the shape of the teeth 154 prevent upward movement of the rack 148 with respect to the pawl 150 for a distance as much as one tooth space, the rack is moved upward three spaces and the pawl 149 will cam over the other two tooth spaces of its travel. As succeeding recordings are effected the lead 129 will wear away; and, as the latter happens, the pawl 149 moves the rack 148 downward increasing distances before the resistance offered by spring 147 overcomes the force of the spring 156 and the pawl 149 cams over its teeth 153 to permit its full downward travel of five teeth. When enough lead is worn away so that the pawl 149 is permitted to move the rack the equivalent of four tooth spaces before it is cammed out of the tooth space it is occupying, the pawl 150 will then cam over a tooth 154 into the next higher tooth space. Then, as the pawl 150 will only permit the rack 148 to move upward a distance of three tooth spaces on the next upward movement of the arm 137, the rack 148 and lead 129 will occupy a lower position with respect to the pawls and the lead will then have been fed downward a distance of one tooth. This feeding action will, of course, continue with succeeding recordings until the lead is used up and needs replacing.

Before a recorder is assigned to a workman, an authorized person, for example his supervisor, having a master key, not shown, unlocks the lock 160 and removes the cover 27 and sets the stops 86 in the proper grooves 87 of the slots 85, so that for each one-tenth of an hour while the recorder is in operation, one unit of digital value will be entered in the elapsed time accumulator 107, digital values representing the workman's pay rate for one-tenth of an hour will be entered in the labor accumulator 106, and digital values representing the burden rate for one-tenth of an hour will be entered in the burden accumulator 105. After setting the stops 86 in the desired position, the cover 27 is replaced and locked and the recorder given to the workman.

When a workman begins an assigned job he effects a "start operation" of the recorder 10, during which a fresh record card 19 is inserted in the card holder 15 and locked in position by the card latch lever 32. The start operation is effected by inserting a key 161 (Fig. 3) in a key hole 162 in the end of start shaft 68 and turning the key 161 first 60° clockwise as viewed in Fig. 2 and then turning the key 60° counterclockwise back to the position shown. The card 19 is fully inserted in the card holder when the key has been turned the 60° clockwise and, as will later appear, is locked in position when the key is turned counterclockwise back to the position shown. The parts are shown in full lines in Fig. 2 in the position they occupy after a start operation has been completed. Before a start operation, a start-stop interlock element 164, which is pivoted on a stud 165 carried by the support plate 13, is in the dotted line position thereof shown in Fig. 2. When a start operation is begun by turning the shaft 68 clockwise 60° as above noted, the outer corner of an edge 166 of a segmental plate 167 fixed on the shaft 68, engages the lower end of a finger 168 of the pivoted interlock 164, with the latter in the dotted line position, and rotates the interlock in a counterclockwise direction about the pivot stud 165. When the interlock has been rotated counterclockwise far enough where an over-center tension spring 170, connecting a tail element 171 of the start-stop interlock 164 and a fixed stud 171a on the support plate 13, moves below the axis of pivot stud 165, the spring 170 will then urge the interlock 164 in a counterclockwise direction and will thereby quickly move the lower end of finger 172 into engagement with the periphery of plate 167. When the workman rotates the shaft 68 counterclockwise back to the position shown, the lower notched end of finger 172 engages behind the outer corner of edge 166 as shown in full lines in Fig. 2, and thereby locks the shaft 68 in the position shown. The shaft 68 can be unlocked and another start operation effected only after the workman has effected a stop operation in a manner which will appear more fully hereinafter.

When the above described 60° clockwise rotation of the shaft 68 begins, a spring-controlled detent 173 is engaged by the outer periphery of a second segmental plate 174 fixed to the shaft 68, so that a reverse rotation of the shaft 68 is prevented by the detent until a corner 175 of the plate 174 passes the outer end of the detent and thereby provides sufficient clearance for the detent so that its spring can return it to the position shown in Fig. 2. The latter will happen at the end of the 60° of clockwise movement. The 60° clockwise movement of the shaft 68 is limited by a stud 176 on the plate 13 engaging the edge 177 of the plate 174. The detent 173 is also engaged by the periphery of plate 174 when the return 60° counterclockwise movement of shaft 68 is begun and the detent thus prevents a reverse direction of movement of the shaft 68 until the 60° of counterclockwise movement is approximately completed. A stud 177 shown in Fig. 2 as engaging the edge 178 of plate 174, determines the normal position of the shaft 68.

As shown in Fig. 1, the other or left-hand end of start shaft 68 is provided with a segmental cam plate 180 fixed thereto and having a relatively high step surface 181 of greater radius and a low step surface 182 of lesser radius. A second arm 183 of the bell crank lever 45, previously described, is formed at its outer end as a cam follower and is normally held in engagement with the periphery of the cam plate 180 by the spring 47. The bell crank 45 is also formed with a third arm 184 which extends upwardly and is provided at its upper end with a pivot pin 185 on which a spring pressed dog 186 is pivoted. The latter is provided with a hook portion 187 normally held in engagement with the right-hand side of the arm 184 as viewed in Fig. 1, by a tension spring 188 connecting a tail element 189 of the dog 186 and a stud 190 on the arm 184. The function of the dog 186 will be explained later in connection with the description of the stop operation.

A second three-arm bell crank or lever 192 is fulcrumed on the stud 46 and comprises one arm 193 which operates a switch 194 connected in series with the synchronous driving motor 50; a second arm 195 which coacts with a spring controlled latching dog 196 pivoted on a stud 197 extending from the plate 12; and a third arm 198 having a pin 199 in the upper end thereof engaging the peripheral surface of a cam disc 200 fixed to a stop shaft 121.

As stated hereinabove, the parts are shown in the relative positions occupied when the recorder is operating. As will be explained hereinafter, when a stop operation is effected the lever 192 is rocked clockwise as shown in Fig. 1, to a position where the outer pointed end of arm 195 thereof is latched and held latched by a projection 201 on the latching dog 196. In moving to the latter position, an insulated projection 202 on lever arm 193 moves the upper end of a switch actuating member 203 to the left. This will permit the inherent spring force in a spring switch blade 204 to move such blade also to the left and thereby open contact points 205 to stop the motor 50. The member 203 is in the form of a flat spring plate having a greater spring force than the switch blade 204 and so mounted at its lower end that it constantly urges the switch blade in a switch closing direction, which is to the right as viewed in Fig. 1. The just described latched position of lever 192 is the one occupied thereby when the recorder is not operating and before a start operation is effected.

With the lever 192 latched in the manner just explained, the initial rotation of the start shaft 68 by the key 161 in a clockwise direction, as viewed in Fig. 2, will move the cam plate 180 counterclockwise 60° as viewed in Fig. 1, with the result that the rocker arm 45 will be rocked clockwise to move, through the linkage previously described, the arm 32 of the card latch downward as viewed in Fig. 10 and thereby clear the card slot 26. A card 19 like the one shown in Fig. 13 is then fully inserted within the slot 26 and the card holder 15 and held therein by hand while the key 161 is turned counterclockwise as viewed in Fig. 2 back to the position shown. This will result in the cam plate 180 being rotated clockwise, as viewed in Fig. 1, to the position shown, and in returning the rocker lever 45 and card latch arm 32 to the position shown in Figs. 1 and 10, where the arm 32 is across the slot 26 and holding the card 19 in its fully inserted position.

When the cam plate 180 is rotated 60° counterclockwise, as viewed in Fig. 1, during the first half of a start operation, a lug 210 fixed on the side of the cam plate 180 engages the lower end of latching dog 196 and moves the latter clockwise out of latching position. The spring member 203 pressing on the lower end of arm 193 then moves the lever counterclockwise, but not far enough to close the switch points, because a lug 211 on arm 193 engages and is thereby stopped by the underside of arm 43 of lever 45 which at this time is held by the high step 181 of the cam plate 180. When the shaft 68 and cam plate 180 are rotated clockwise, as viewed in Fig. 1, and back to the position shown to finish the start operation, the lever 192 will then move counterclockwise along with the lever 45 and the switch points will be closed to start the motor 50.

During the first half of a start operation when the shaft 68 is turned for the 60° counterclockwise movement as viewed in Fig. 4, each of the order elements 75 having a digital value standing therein due to a previous entering operation is reset by being turned counterclockwise to the next "0" digit representing position. The latter is effected by a plurality of radially extending arms 214 fixed at their inner ends to the shaft 68 and extending between adjacent order elements. There is one arm 214 provided for each order element 75 and it extends outwardly along the side of the order ratchet wheel 76 from which the lugs 92 project. The arms 214 are made of spring metal and engage at their outer ends the side surface of their related order ratchet wheels 76. The lugs 92 are wedge shaped, as shown, so that during entering operations the low side of the lugs 92 engage under the outer ends of the spring arms and the latter are forced outward so that the arms 214 can be passed without interference. When the start shaft 68 is turned for the 60° counterclockwise movement as viewed in Fig. 4, to begin the start operation, all of the arms 214 move counterclockwise therewith and will engage the high sides of lugs 92 of any of the order ratchet wheels 76 which are positioned to represent digital values from "1" to "9" inclusive and will rotate such ratchet wheels counterclockwise to a position where they will represent the digit "0." For example, the ratchet wheel 76 in Fig. 4 is positioned to represent the digit "9." Thus, should the shaft 68 be rotated 60° counterclockwise the arm 214 shown will engage the high side of lug 92a and will move the ratchet wheel 76 one tooth space counterclockwise so that the cam finger 130 shown will be opposite the lowest step 112a of the next segment 111 which lowest step represents the digit "0," as stated previously.

With all order elements turned to "0," and a fresh card 19 fully inserted and locked in the card holder and with the switch contacts 205 closed, the recorder then begins to operate and will continue to operate and accumulate values in the manner above explained until the workman effects a "stop" operation. He will do this when the assigned job is completed and when work on the job is stopped for any length of time such, for example, as during lunch hour or at the end of the working day. When a stop operation is effected the switch contacts 205 are opened to stop the motor and the digital values standing in the accumulators are recorded in corresponding columns of the card 19. As stated hereinabove, the parts are shown in the position they occupy after the recorder has gone through one entering operation. By way of example, the stop operation will be described as taking place with the parts in the position shown.

A workman effects a stop operation of the recorder by inserting the key 161 in a key hole 215 provided in the right-hand end of stop shaft 121 (see Fig. 2) and by turning the key and shaft first 180° counterclockwise until the edge 216 of a segmental plate 217 fixed to the shaft 121 engages a stud 218 projecting from the support plate 13 and then by turning the stop shaft 121 180° clockwise until the edge 219 of the plate 217 engages the stop 218, as shown in Fig. 2. The stop shaft 121 is also provided with a segmental plate 220 fixed thereto, and when the shaft 121 is turned for 180° counterclockwise movement as viewed in Fig. 2 during the first part of the stop operation an edge 221 of the plate 220 engages the outer end of a finger 222 extending from the start stop interlock element 164 and moves such finger 222 and interlock 164 clockwise to a point where the over-center spring 170 is above the axis of the pivot pin 165. When the latter happens, the spring 170 will continue the clockwise movement of the interlock 164 until the upper notched end of finger 223 engages the periphery of member 220. When the stop shaft 121 is then turned for 180° clockwise movement to complete the stop operation and to the position shown in Fig. 2, the upper notched end of finger 223 will engage the outer corner of edge 221 of member 220 and thereby lock the shaft 121 in the stop position. The latter position of the interlock 164 is indicated in dotted lines in Fig. 2, as was explained previously. As was the case with the start shaft, a spring controlled detent 225 coacts with the peripheral surfaces of the segmental plate 217 to assure that when either a clockwise or a counterclockwise movement of the stop shaft is commenced such movement must be completed before movement in the opposite direction can be effected.

Referring to Fig. 1, it will be apparent that the cam disc 200 on the left-hand end of the stop shaft 121 will be moved first 180° clockwise and then 180° counterclockwise, when a stop operation is effected. Movement of the cam disc 200 for 180° clockwise movement will cause the pin 199 on the upper end of arm 198 to move out of a recess 227 in the cam 200 and onto the high surface of such cam and thereby provide for a clockwise movement of the lever 192 from the position shown. The latter will result in the arm 195 engaging the latching dog 196 to latch the lever 192 at the end of such clockwise movement, as previously explained. Also, the arm 193 will move the switch actuating member 203 to the left and thereby effect the opening of the switch contacts 205 and stop operation of the motor 50. It is noted that the latching of the lever 192 and the opening of contacts 205 are effected at the very beginning of each stop operation.

It is also noted that as the cam plate 200 rotates 180° clockwise to begin the stop operation, a pin 228 projecting therefrom engages the upper surface of the dog 186 and moves the latter counterclockwise about its pivot pin 185 against the force of the spring 188 until the pin 228 clears the dog. The spring 188 then returns the dog to the position shown in Fig. 1. As the cam plate 200 is rotated 180° counterclockwise, as viewed in Fig. 1, back to the position shown to complete the stop operation, the pin 228 engages the inclined edge 229 of the dog 186 near the end of such movement and through the hooked end 187 of the dog engaging the right side of the lever arm 184, moves the rocker lever 45 clockwise to effect operation of the card latch arm 32 to release the card 19 within the card holder 15. As will be apparent from the previous description, when the rocker 45 is moved clockwise the card latch arm 32 shown in Fig. 10 will be moved clockwise or downward to clear the card throat and the spring fingers 28 at the right-hand end of the card holder as viewed in Fig. 9 will then partially eject the card 19 from the holder so that the card can be withdrawn the rest of the way by hand. Thus, the card 19 is released at the completion of the stop operation.

When the stop shaft 121 is first rotated 180° counterclockwise, as viewed in Fig. 2, the shaft 121 will appear in Fig. 4 as being rotated 180° clockwise and, as this happens, the bail 119 carried by the arms 120 which are fixed to the shaft 121, will also move clockwise and thereby permit the arms 118 of all of the recording levers 115 to rotate clockwise under force of the springs 122 until the fingers 130 on such arms 118 engage positioning steps 112 of their related order elements 75. The levers 115 are thus positioned by the related steps 112 and the pencil barrels 128 carried thereby will be properly positioned above the digit positions on the record card corresponding to the digit values represented by the positions of the related steps 112.

Near the end of the clockwise movement of the shaft 121, as viewed in Fig. 4, cams 232 fixed to the ends of shaft 121 (see also Fig. 5) engage arms 233 which are pivoted on studs 234 extending from the inside of the support plates 12 and 13, respectively. The arms 233 carry the bail 140 previously referred to as engaging with the upper ends of all of the pencil operating arms 137. Thus, when the cams 232 engage the arms 233 they move the latter and the bail 140 clockwise, as viewed in Fig. 4, and thereby effect a downward movement of all arms 137 to provide operative engagement of the pencil leads 129 with the card 19 in the manner previously described.

As shown in Figs. 2 and 3, the right-hand end of the stop shaft 121 is provided with a cam 235 which engages the upper end of a lever 236 fulcrumed intermediate its ends on the start shaft 68. The lower end of lever 236 engages the outer end of an arm 237 of a bell crank 238 pivoted on a stud 239 extending upwardly from the base plate 11 (see Figs. 2, 4, and 9). The other arm 240 of the bell crank 238 engages a pin 241 extending downwardly from the bottom plate 16 of the card holder 15. A tension spring 242 connected at one end to the pin 241 and at its other end to the upright support plate 13 maintains the pin 241 in engagement with the arm 240 of the bell crank 238 and thereby also keeps arm 237 in engagement with the lower end of lever 236 and keeps the upper end of the lever 236 in engagement with the cam 235 on the stop shaft 121.

As will be seen from Fig. 2, when the stop shaft 121 is turned 180° counterclockwise to effect the first part of the stop operation, the high point of the cam 235 engages the upper end of the lever 236 near the end of its movement and thereby moves the latter clockwise about its fulcrum to move the bell crank 238 and the pin 241 against the force of the spring 242. As the pin 241 is fixed to the card holder 15, such movement will result in the card holder being moved to the left, as viewed in Fig. 9. When the stop shaft 121 is then rotated 180° clockwise, as viewed in Fig. 2, to complete the stop operation, the upper end of the lever 236 will move from the high point of the cam 235 during the first part of this movement and back to the position shown, which will result in the spring 242 returning the card holder 15 to the position shown in Fig. 9. The just described movement of the card holder 15 to the left, as viewed in Fig. 9, during the latter part of the counterclockwise movement, as viewed in Fig. 2, of shaft 121, and the return movement of the card holder to the position shown during the first part of the clockwise movement of shaft 121, occurs at a time when the leads 129 are held in engagement with the card 19 by the bail 140 and arms 137, as previously described. It is obvious that such movements of the card holder will result in the placement of elongated and substantially rectilinear areas of the electrically conducting material on the surface of the card in the vicinity of the selected columnar index point positions thereof as shown in Fig. 13. These elongated marks extend a slight distance to each side of the center of the card columns and the long axes of the marks are transverse to the columnar axes. In actual practice it has been found that by moving the carriage first in one direction and then in the opposite direction so that the marking device retraces its original marked path, a mark possessing superior electrical conducting qualities is attained and there is little likelihood of failure of the sensing apparatus in the accounting machine during subsequent processing of the cards. Whereas in the prior art where marking of the cards is in one direction only, certain microscopic voids in the surface of the card fail to receive thereon a coating of the marking material, in the present instance, where marking takes place in opposite directions, these voids are completely filled. Furthermore, when marking in one direction, the surface fibers of the card become coated on one side thereof so that after the card has been removed from the machine and the fibers become erect only partial conductivity is afforded, when the marking device is caused to retrace its path of travel relative to the card, the fibers are brushed aside, so to speak, in opposite directions and the conducting marking material is applied to both sides of these fibers, thereby resulting in a coated area of relatively low ohmage and consequent high conductivity.

As stated, the stop operation is described herein as taking place after one entering operation has been effected. Consequently, electrically conducting marks are placed on the card 19 in the index point positions of the columns to represent the amounts standing in the three accumulators after one entering operation. Fig. 13 shows the card with the amounts recorded thereon. The electrically conducting marks are indicated by the reference character 245.

Record cards having numerical data recorded therein by the time recorder of the present invention and in the manner described hereinabove, may be used in apparatus of the type disclosed in U. S. Patent to Bryce No. 2,007,391 and Johnson No. 2,275,396, wherein they will control the punching of numerical code hole designations in the index point positions of standard electrical accounting machine cards.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. In apparatus for applying an electrically conductive mark to a record sheet at a selected columnar index point position, means for holding the record sheet, an applicator carrying conductive material, means for moving said applicator to engage said sheet at a selected position, and means for successively moving the said holding means through a predetermined distance to trace and retrace a conductive path.

2. In an apparatus for applying an electrically conductive material to the surface of a record sheet in the immediate vicinity of a selected columnar index point position on the sheet, a holder for positioning the record sheet in a stationary recording position, an applicator movable from a retracted position wherein it is out of registry with the selected index point position to an intermediate position wherein it is in register with said index point position but out of contact with the surface of the sheet and thereafter movable to a fully advanced position wherein it engages the surface of the sheet in the vicinity of the selected index point position, means for moving said applicator from its retracted to its intermediate position, means for moving said applicator from its intermediate to its fully advanced position, and means for moving the record holder laterally of the applicator when the latter is in its fully advanced position to trace and retrace a conductive path first in one direction and then in the opposite direction to permit the applicator by its sliding contact with the record sheet in the holder to deposit marks of conductive material on the surface of the card in the vicinity of the selected index point position.

3. In an apparatus for applying a relatively dense mass of electrically conductive material to the surface of a record sheet in the immediate vicinity of a selected columnar index point position on the sheet, a holder for positioning the record sheet in a stationary recording position, said holder being movable within limits in opposite directions, yieldable means normally urging said holder to one extreme position, an applicator movable from a retracted position wherein it is out of registry with the selected index point position to an intermediate position wherein it is in register with said index point position but out of contact with the surface of the sheet and thereafter movable to a fully advanced position wherein it engages the surface of the sheet in the vicinity of the selected index point position, means for moving said applicator from its retracted to its intermediate position, means for moving said applicator from its intermediate to its fully advanced position, means for engaging the record holder and moving the same from its initial normal extreme position to its other extreme position and for releasing the latter to permit its return to its initial position when the applicator is in its fully advanced position to permit the latter by its sliding contact with the record sheet in the holder to trace and retrace successive layers of conductive marking material on the surface of the sheet at the selected index point position.

4. In an apparatus for applying an electrically conductive marking material to the surface of a record sheet in the immediate vicinity of a selected columnar index point position on the sheet, a holder for positioning the record sheet in a stationary recording position with the sheet uniformly curved on a relatively long radius of curvature so that the card columns extend in the arcuate direction of the curved sheet, an applicator mounted for swinging movement about an axis substantially coincident with the center of curvature of the record sheet and movable from a retracted position wherein it is out of registry with the selected index point position to an intermediate position wherein it is in register with said index point position but out of contact with the surface of the sheet, said applicator also being movable radially of the curved sheet to a fully advanced position wherein it engages the surface of the sheet in the vicinity of the selected index point position, means for swinging said applicator from its retracted to its intermediate position, means for moving said applicator in a radial direction relative to the sheet from its intermediate to its fully advanced position, and means for shifting the record holder laterally of the applicator through a limited distance in the direction of the axis of curvature of the sheet to permit the applicator by its sliding contact with the record sheet in the holder to trace and retrace an elongated mass of the conductive marking material on the surface of the sheet at the selected index point position.

5. In an apparatus for applying an electrically conductive marking material to the surface of a record sheet in the immediately vicinity of a selected columnar index point position on the sheet, a holder for positioning the record sheet in a stationary recording position with the sheet uniformly curved on a relatively long radius of curvature so that the card columns extend in the arcuate direction of the curved sheet, an applicator mounted for swinging movement about an axis substantially coincident with the center of curvature of the record sheet and movable from a retracted position wherein it is out of registry with the selected index point position to an intermediate position wherein it is in register with said index point position but out of contact with the surface of the sheet, said applicator also being movable radially of the curved sheet to a fully advanced position wherein it engages the surface of the sheet in the vicinity of the selected index point position, means for swinging said applicator from its retracted to its intermediate position, means for moving said applicator in a radial direction relative to the sheet from its intermediate to its fully advanced position, and means for shifting the record holder laterally of the applicator through a limited distance in opposite directions to permit the applicator by its sliding contact with the record sheet in the holder to trace and retrace successive layers of the conductive marking material on the surface of the sheet at the selected index point position.

6. In an apparatus for applying an electrically conductive marking material to the surface of a record sheet in the immediate vicinity of a selected columnar index point position on the sheet, a holder for intermittently positioning the record sheet in a stationary recording position with the sheet uniformly curved on a relatively long radius of curvature in one direction, an elongated applicator having one end thereof designed for frictional marking engagement with the surface of the record sheet, said applicator being mounted for swinging movement about the center of curvature of said sheet with its operative marking end thereof slightly spaced from said sheet, means normally maintaining said applicator in a retracted position wherein its marking end is out of registry with the selected index point position, means for swinging said applicator to an intermediate position wherein its marking end is in register with the selected index point position, means for moving the applicator axially from its intermediate to a fully advanced position wherein the marking end thereof engages the record sheet in the vicinity of the selected index point position, and means for shifting the record holder laterally of the applicator in a direction normal to the direction of curvature of the record sheet when the applicator is in its fully advanced position through a limited distance to permit the applicator by its sliding contact with the record sheet in the holder to successively deposit elongated masses of the conductive marking material on the surface of the sheet at a selected index point position.

7. In recording apparatus of the type wherein data are entered at a definite time rate in a register having one or more ordered elements composed, respectively, of a plurality of data-representing positions, and wherein the data indicated by the register are recorded in a record sheet having a column of data-representing positions for each of the ordered elements; the combination of a holder for intermittently positioning the record sheet in a stationary recording position; a recording element for each record column and its related ordered element and each recording element comprising a marking material having electrically conducting characteristics and being movable into a recording position with respect to any one of the data-representing positions of its related record column; and means for effecting a recording operation comprising means for moving each recording element into recording position with respect to a data-representing position of its related record column which data-representing position corresponds to the data indicated by the related ordered element, means for effecting contact of the marking material of each recording element and the record sheet, and means operable while said last-named means effects contact between said recording element and said record sheet, for moving said holder a predetermined amount back and forth in the general direction of extent of said record sheet so that elongated marks are traced and retraced on said sheet at the designated data-representing positions.

THOMAS J. WATSON.
ALFRED L. SPRECKER.

REFERENCES CITED

The following references are of record in the file of this patent:

UNITED STATES PATENTS

| Number | Name | Date |
| --- | --- | --- |
| 1,106,710 | Ingalls | Aug. 11, 1914 |
| 1,213,356 | Hall | Jan. 23, 1917 |
| 1,936,208 | Pitt | Nov. 21, 1933 |
| 2,346,675 | Hackenberg et al. | Apr. 18, 1944 |